(12) United States Patent
Yoda et al.

(10) Patent No.: US 12,416,520 B2
(45) Date of Patent: Sep. 16, 2025

(54) SPECIFYING SYSTEM, SPECIFYING APPARATUS, AND SPECIFYING METHOD

(71) Applicant: NEC Corporation, Tokyo (JP)

(72) Inventors: Yukihide Yoda, Tokyo (JP); Koyo Mori, Tokyo (JP); Tadayuki Iwano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 18/032,138

(22) PCT Filed: Oct. 28, 2020

(86) PCT No.: PCT/JP2020/040376
§ 371 (c)(1),
(2) Date: Apr. 14, 2023

(87) PCT Pub. No.: WO2022/091242
PCT Pub. Date: May 5, 2022

(65) Prior Publication Data
US 2023/0384141 A1    Nov. 30, 2023

(51) Int. Cl.
| | | |
|---|---|---|
| *G01F 23/14* | (2006.01) | |
| *E02B 3/04* | (2006.01) | |
| *G01F 23/22* | (2006.01) | |
| *G01N 21/95* | (2006.01) | |
| *G08C 23/06* | (2006.01) | |
| *H04N 7/22* | (2006.01) | |
| *H04N 23/661* | (2023.01) | |

(52) U.S. Cl.
CPC .............. *G01F 23/14* (2013.01); *E02B 3/04* (2013.01); *G01F 23/22* (2013.01); *G01N 21/95* (2013.01); *G08C 23/06* (2013.01); *H04N 7/22* (2013.01); *H04N 23/661* (2023.01)

(58) Field of Classification Search
USPC .......................................................... 348/125
See application file for complete search history.

(56) References Cited

FOREIGN PATENT DOCUMENTS

| JP | H06-74768 A | 3/1994 |
|---|---|---|
| JP | 2001-249035 A | 9/2001 |
| JP | 2001-296151 A | 10/2001 |
| JP | 2002-054974 A | 2/2002 |
| JP | 2002269656 A * | 9/2002 |
| JP | 2003-232043 A | 8/2003 |
| JP | 2004-361323 A | 12/2004 |
| JP | 2012-198079 A | 10/2012 |

OTHER PUBLICATIONS

International Search Report for PCT Application No. PCT/JP2020/040376, mailed on Dec. 28, 2020.

* cited by examiner

*Primary Examiner* — Amir Shahnami
(74) *Attorney, Agent, or Firm* — Sughrue Mion, PLLC

(57) ABSTRACT

A specifying system according to the present disclosure includes an optical fiber (30) laid along a levee (20) of a river (10), a communication unit (41) configured to receive, from the optical fiber (30), an optical signal containing a pattern that changes according to a state of the levee (20), and a specifying unit (51) configured to specify a water level of the river (10) based on the pattern that changes according to the state of the levee (20).

12 Claims, 24 Drawing Sheets

IN ABNORMAL STATE (LEVEE 20 HAS BEEN ERODED BY OVERTOPPING)

IN NORMAL STATE

IN ABNORMAL STATE (LEVEE 20 HAS BEEN ERODED BY OVERTOPPING)

IN ABNORMAL STATE (OPTICAL FIBER 30 IS EXPOSED AND
INUNDATED DUE TO OVERTOPPING AND EROSION OF LEVEE 20)

IN NORMAL STATE

IN ABNORMAL STATE (OPTICAL FIBER 30 IS EXPOSED AND INUNDATED DUE TO OVERTOPPING AND EROSION OF LEVEE 20)

| CAMERA IDENTIFIER | PHOTOGRAPHING POSSIBLE AREA (DISTANCE FROM SENSING APPARATUS) |
|---|---|
| #1 | aa[m] ~ bb[m] |
| #2 | cc[m] ~ dd[m] |
| #3 | ee[m] ~ ff[m] |

SPECIFYING SYSTEM, SPECIFYING APPARATUS, AND SPECIFYING METHOD

This application is a National Stage Entry of PCT/JP2020/040376 filed on Oct. 28, 2020, the contents of all of which are incorporated herein by reference, in their entirety.

TECHNICAL FIELD

The present disclosure relates to a specifying system, a specifying apparatus, and a specifying method.

BACKGROUND ART

In recent years, disasters such as river flooding and floods have frequently occurred due to typhoons and other storms. Therefore, in order to improve the efficiency of responses to disasters, it is necessary to collect, in real time, information about the water levels of rivers where flooding or a flood could occur.
Under the present circumstances, the water levels of rivers are checked by visually checking video images taken by cameras and/or visually observing the rivers with the human eye.

However, regarding the visual observation with the human eye, the range of an area that can be observed at one time is limited to a localized area. Further, regarding the visual observation with the human eye, it may be difficult to accurately determine the state of a river depending on the weather (rough weather or the like) and time of day (nighttime or the like).

Therefore, it is necessary to check the state of a river(s) in a wide area and in real time without relying on visual observation with the human eye.

Meanwhile, recently, a technology called optical fiber sensing, which enables sensing in a wide area and in real time by using optical fibers as sensors, has attracted attention, and various proposals for using optical fiber sensing have been made.

For example, in a technology disclosed in Patent Literature 1, optical fibers are buried under the ground in such manner that they extend along a bank. Then, an amount of a distortion at each of a plurality of points of an optical fiber is calculated by detecting scattered light that is emitted from the optical fiber when pulsed light is applied to the optical fiber. The amount of the distortion at each point of the optical fiber increases according to the increase in an amount of movement of soil. Therefore, an occurrence of a disaster such as a landslide is detected based on the amount of the distortion at each point calculated as described above.

Further, in a technology disclosed in Patent Literature 2, optical fibers are buried inside a levee and parallel to the inclined surface of the levee. Further, a change in the state of the levee is detected by applying light to an optical fiber and measuring a change in scattered light caused by a distortion of the optical fiber.

CITATION LIST

Patent Literature

Patent Literature 1: Japanese Unexamined Patent Application Publication No. 2003-232043
Patent Literature 2: Japanese Unexamined Patent Application Publication No. 2001-249035

SUMMARY OF INVENTION

Technical Problem

However, the technology disclosed in Patent Literature 1 is a technology for detecting an occurrence of a disaster such as a landslide, and the technology disclosed in Patent Literature 2 is a technology for detecting a change of a levee, such as damage thereto.
Therefore, it is impossible to specify (i.e., measure or determine) the water level of a river by using the technologies disclosed in Patent Literatures 1 and 2.
Therefore, an object of the present disclosure is to solve the above-described problem and to provide a specifying system, a specifying apparatus, and a specifying method capable of specifying the water level of a river.

Solution to Problem

A specifying system according to an aspect includes:
an optical fiber laid along a levee of a river;
a communication unit configured to receive, from the optical fiber, an optical signal containing a pattern that changes according to a state of the levee;
and a specifying unit configured to specify a water level of the river based on the pattern.
A specifying apparatus according to an aspect includes:
a communication unit configured to receive, from an optical fiber laid along a levee of a river, an optical signal containing a pattern that changes according to a state of the levee; and
a specifying unit configured to specify a water level of the river based on the pattern.
A specifying method according to an aspect is a specifying method performed by a specifying apparatus, including:
a receiving step of receiving, from an optical fiber laid along a levee of a river, an optical signal containing a pattern that changes according to a state of the levee; and
a specifying step of specifying a water level of the river based on the pattern.

Advantageous Effects of Invention

According to the above-described aspect, an advantageous effect that it is possible to provide a specifying system, a specifying apparatus, and a specifying method capable of specifying the water level of a river is obtained.

EXAMPLE EMBODIMENT

Figure 1:
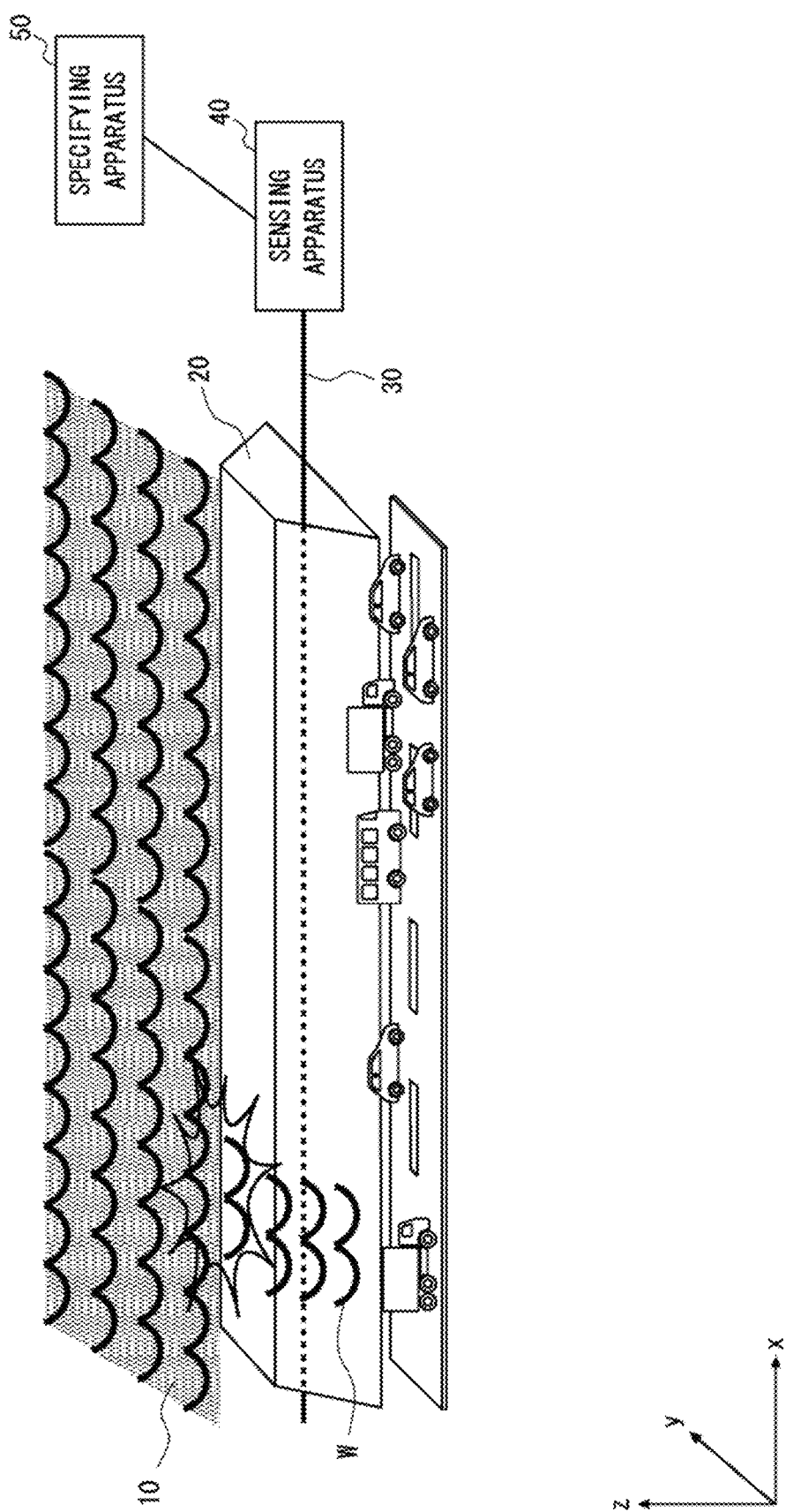
FIG. 1 shows an example of an image of a specifying system according to a first example embodiment.

An example embodiment according to the present disclosure will be described hereinafter with reference to the drawings. Note that the following descriptions and drawings are partially omitted and simplified as appropriate for clarifying the explanation. Further, the same reference numerals (or symbols) are assigned to the same components throughout the drawings, and duplicate descriptions thereof are omitted as appropriate.

First Example Embodiment

Firstly, an example of an image of a specifying system according to a first example embodiment will be described with reference to FIG. 1.

As shown in FIG. 1, the specifying system according to the first example embodiment includes an optical fiber 30 laid along a levee 20 of a river 10. In particular, the optical fiber 30 is buried inside the levee 20 and along the levee 20. Note that FIG. 1 shows a state in which water W of the river 10 has overtopped (i.e., has overflowed over) the levee 20 and flowed out onto a road running along the levee 20.

Further, one end of the optical fiber 30 is connected to a sensing apparatus and the sensing apparatus 40 is connected to a specifying apparatus 50. The specifying apparatus 50 can be disposed in a place remote from the sensing apparatus 40, for example, in a cloud system.

Figure 2:
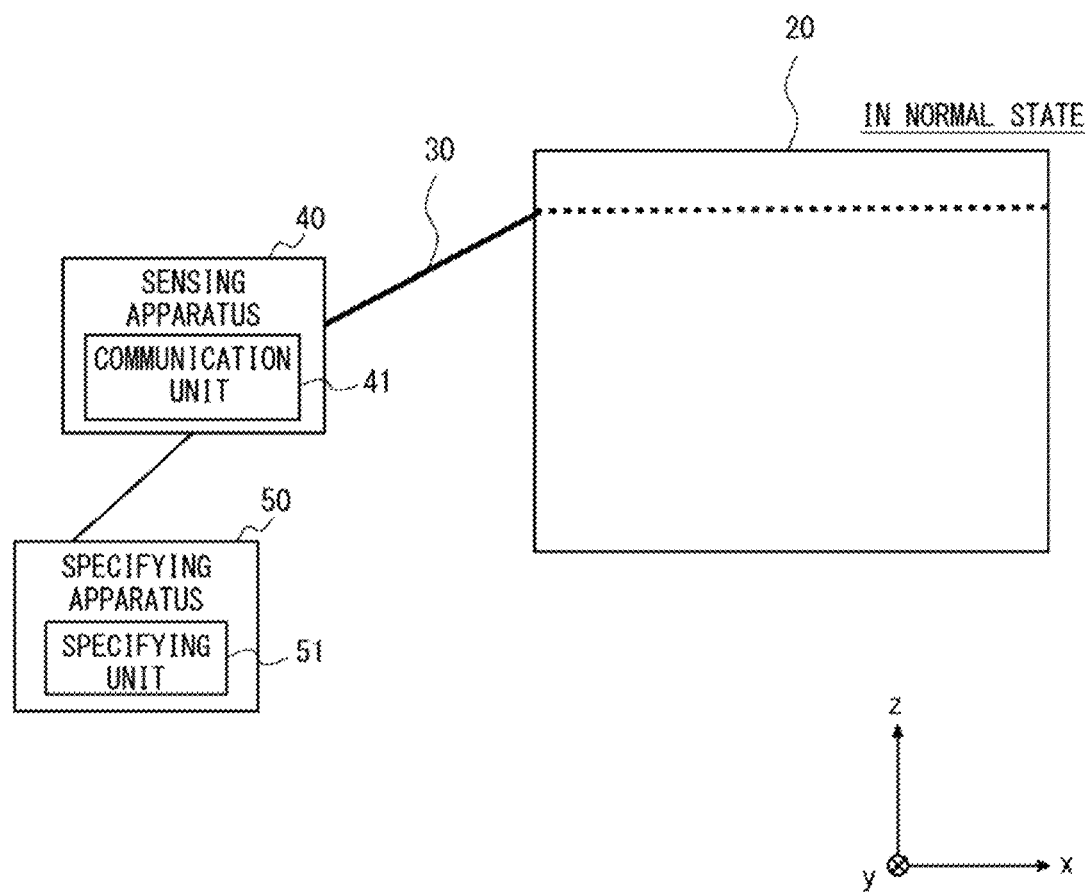
FIG. 2 shows an example of a configuration of the specifying system according to the first example embodiment.
Figure 3:
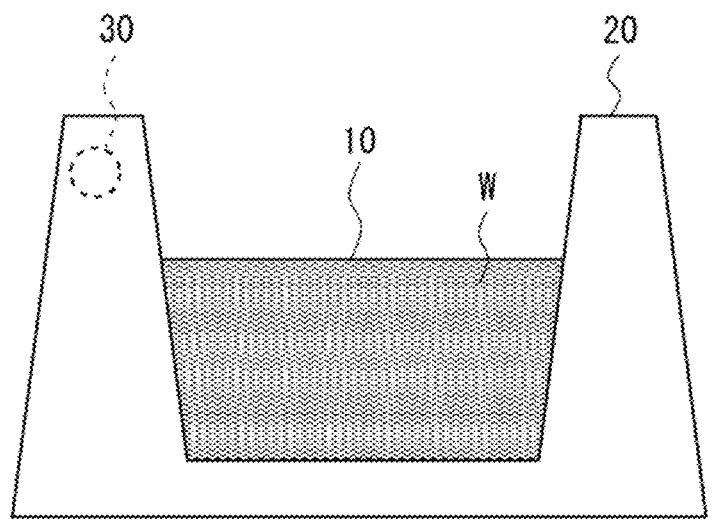
FIG. 3 is a cross-sectional diagram showing an example of a levee in a normal state.

Next, an example of the configuration of the specifying system according to the first example embodiment will be described with reference to FIGS. 2 and 3. Note that FIGS. 2 and 3 show cross sections of the levee 20 in a normal state. In particular, FIG. 2 shows a cross section parallel to the river 10 and FIG. 3 shows a cross section perpendicular to the river 10.

As shown in FIGS. 2 and 3, the specifying system according to the first example embodiment includes the optical fiber 30, the sensing apparatus 40, and the specifying apparatus 50 as described above. Further, the sensing apparatus includes a communication unit 41, and the specifying apparatus 50 includes a specifying unit 51.

The communication unit 41 applies pulsed light to the optical fiber 30, and receives reflected light and/or scattered light, which are caused (or generated) as the pulsed light is transmitted through the optical fiber 30, as an optical signal through the optical fiber 30.

Note that when the water level of the river 10 rises and overtopping occurs, the levee 20 vibrates. The vibrations are transmitted to the optical fiber and change the characteristics (e.g., the wavelength) of the optical signal transmitted through the optical fiber 30. Therefore, the optical fiber 30 can detect the vibrations that have occurred in the levee 20. Further, since the characteristics of the optical signal transmitted through the optical fiber 30 change according to the vibrations caused in the levee 20, the optical signal contains a vibration pattern that changes according to the state of the vibrations of the levee 20. This vibration pattern is a unique pattern having a different (i.e., unique) strength of vibrations, a different (i.e., unique) place where the vibrations occurred, a different (i.e., unique) transition of changes in frequency, and the like.

Further, when the water level of the river 10 rises and hence overtopping occurs, the temperature of the levee 20 changes. This change in temperature is also transferred to the optical fiber 30. Therefore, the optical signal transmitted through the optical fiber 30 also contains a temperature pattern that changes according to the temperature state of the levee 20.

Therefore, by analyzing the dynamic changes in the pattern that changes according to the vibration state or the temperature state of the levee 20, contained in the optical signal received by the communication unit 41, the specifying unit 51 can specify the rise of the water level of the river 10 and an occurrence of overtopping, i.e., can specify the water level of the river 10.

Therefore, the specifying unit 51 specifies the water level of the river 10 based on the pattern that changes according to the state (the vibration state or the temperature state) of the levee 20, contained in the optical signal received by the communication unit 41.

An example of a method for specifying the water level of the river 10 performed in the specifying unit 51 will be described hereinafter.

(1) First Method

Figure 4:
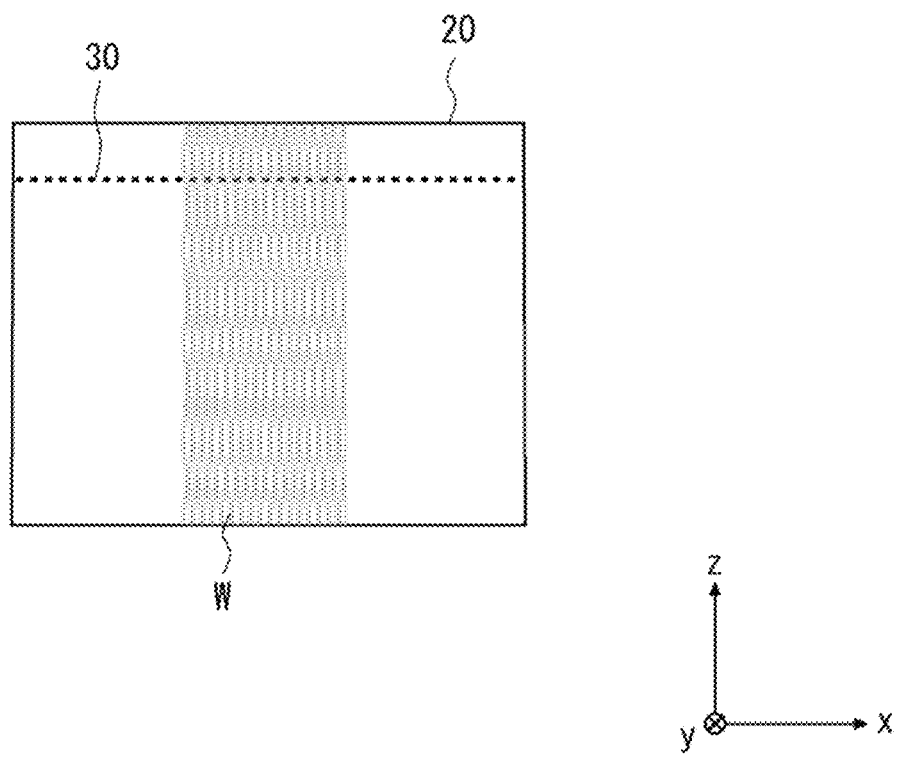
FIG. 4 is a cross-sectional diagram showing an example of the levee when the levee has been eroded due to overtopping of water of the river.
Figure 5:
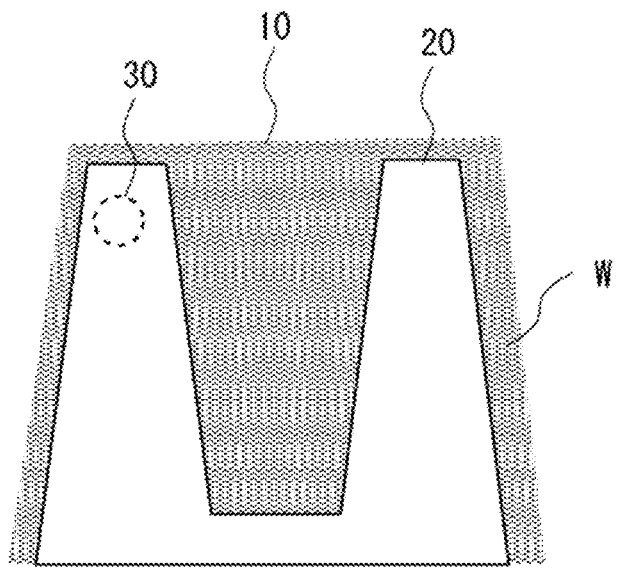
FIG. 5 is a cross-sectional diagram showing an example of the levee when the levee has been eroded due to overtopping of water of the river.
Figure 5:
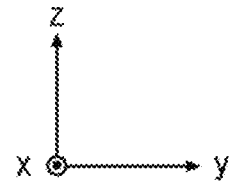
Figure 6:
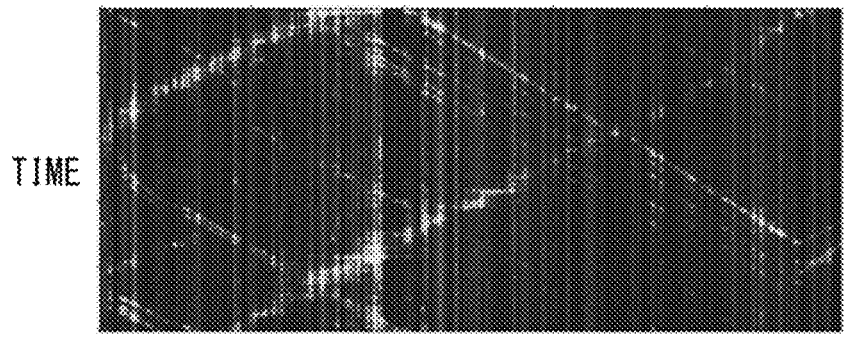
FIG. 6 shows an example of a vibration pattern contained in an optical signal received by a communication unit according to the first example embodiment.
Figure 7:
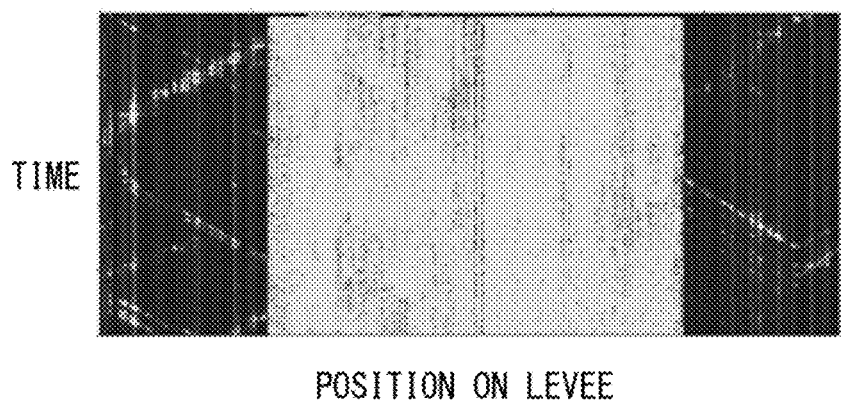
FIG. 7 shows an example of a vibration pattern contained in an optical signal received by the communication unit according to the first example embodiment.

Firstly, a first method for specifying the water level of the river 10 will be described with reference to FIGS. 4 to 7. The first method is an example in which, as shown in FIGS. 4 and 5, the overtopping of the water W of the river 10 is specified (i.e., determined) when the levee 20 has been eroded due to the overtopping of the water W of the river 10. Note that, in each of FIGS. 4 and 5, a cross section of the levee 20 in a state in which the levee 20 has been eroded due to the overtopping is shown. In particular, FIG. 4 shows a cross section parallel to the river 10 and FIG. 5 shows a cross section perpendicular to the river 10. Each of FIGS. 6 and 7 shows an example of a vibration pattern contained in the optical signal received by the communication unit 41, in which the horizontal axis indicates the position on the levee 20 (i.e., the distance from the sensing apparatus 40) and the vertical axis indicates the transition of the vibrations over time. For example, the movement of a vehicle or a pedestrian over time is represented by one diagonal line in each of FIGS. 6 and 7. In particular, FIG. 6 shows an example of a vibration pattern when the levee 20 is normal, and FIG. 7 shows an example of a vibration pattern when the levee 20 is abnormal (an occurrence of erosion in this example).

For example, the specifying unit 51 can specify, based on a time difference between a time when the communication unit 41 applied pulsed light to the optical fiber 30 and a time when the communication unit 41 received an optical signal from the optical fiber 30, the position on the levee 20 (i.e., the distance from the sensing apparatus 40) where a vibration pattern contained in the optical signal has occurred.

As shown in FIG. 6, when the levee 20 is normal, vibrations occur due to the movements of vehicles and pedestrians, but the sections (i.e., the durations) of such vibrations are narrow.

In contrast to this, as shown in FIG. 7, when erosion has occurred in the levee 20, the section (i.e., the duration) of the vibrations is wide, indicating that the vibrations continuously occur over a long time.

Therefore, in the example shown in FIG. 7, the specifying unit 51 can determine that overtopping of the water W of the river 10 has occurred. Further, the specifying unit 51 can determine that a defect (erosion in this example) has occurred in the levee 20 based on the result of the above-described determination. Further, since the specifying unit 51 can specify the position on the levee 20 (i.e., the distance from the sensing apparatus 40) where the vibration pattern contained in the optical signal has occurred as described above, it can specify the position on the levee 20 (i.e., the distance from the sensing apparatus 40) where the defect has occurred.

(2) Second Method

Figure 8:
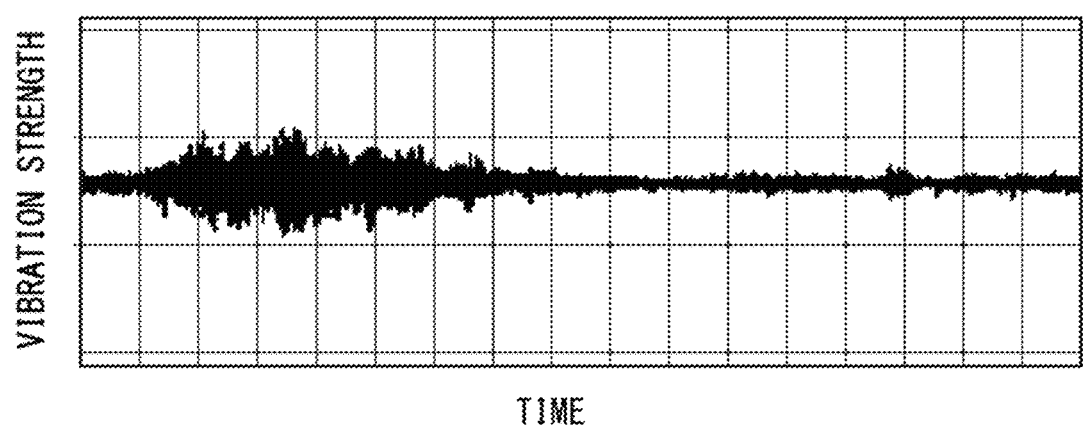
FIG. 8 shows an example of a vibration pattern contained in an optical signal received by the communication unit according to the first example embodiment.
Figure 9:
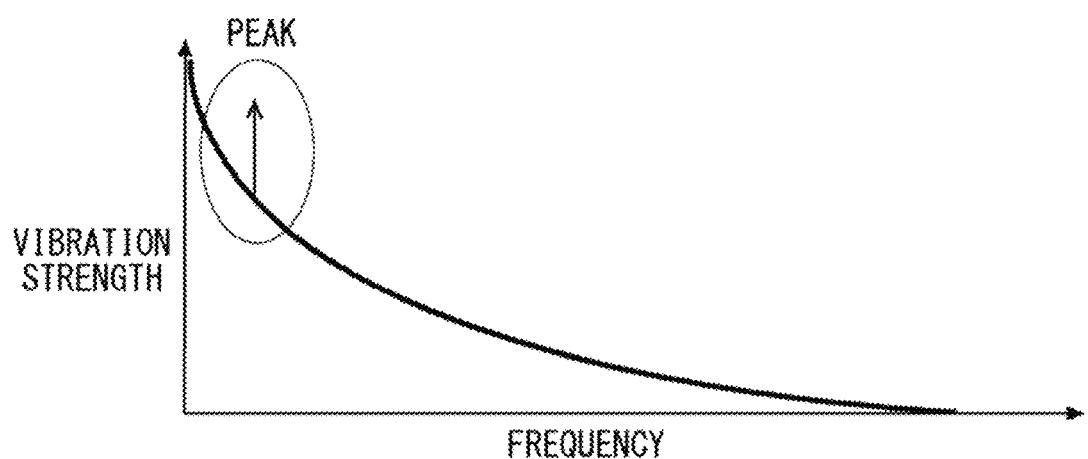
FIG. 9 shows an example of a frequency characteristic of a vibration pattern contained in an optical signal received by the communication unit according to the first example embodiment.
Figure 10:
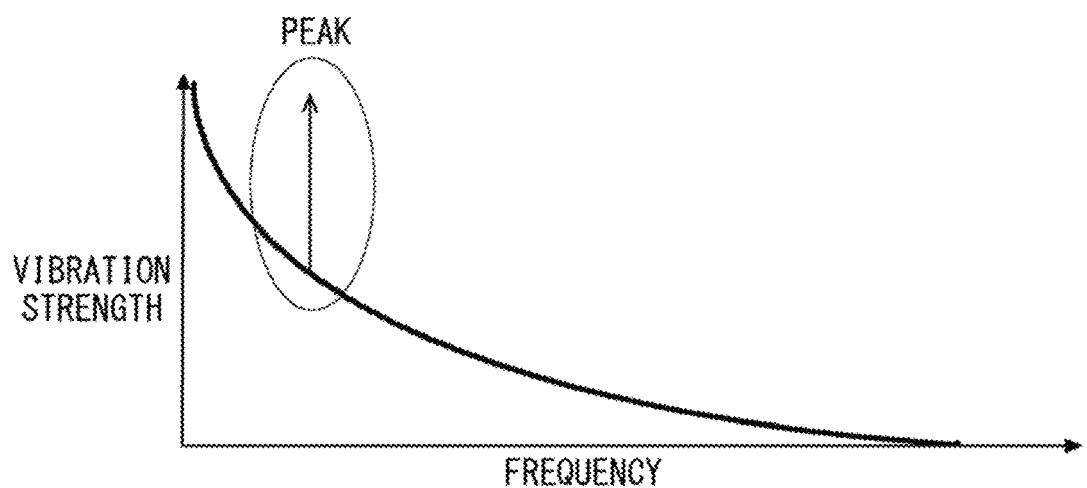
FIG. 10 shows an example of a frequency characteristic of a vibration pattern contained in an optical signal received by the communication unit according to the first example embodiment.

Next, a second method for specifying the water level of the river 10 will be described referring to FIGS. 8 to 10. Similarly to the first method, the second method is an example in which the overtopping of the water W of the river 10 is specified (i.e., determined) when the levee 20 has been eroded due to the overtopping of the water W of the river 10 (see, for example, FIGS. 4 and 5). FIG. 8 shows an example of a vibration pattern at a certain position on the levee 20, contained in the optical signal received by the communication unit 41, in which the horizontal axis indicates the time and the vertical axis indicates the strength of vibrations. Further, each of FIGS. 9 and 10 shows an example of frequency characteristics of a vibration pattern at a certain position on the levee 20, contained in the optical signal received by the communication unit 41, in which the horizontal axis indicates the time and the vertical axis indicates the strength of vibrations. In particular, FIG. 9 shows an example of a vibration pattern when the levee 20 is normal, and FIG. 10 shows an example of a vibration pattern when the levee 20 is abnormal (an occurrence of erosion in this example).

There is a peak of the strength of vibrations in each of the vibration patterns shown in FIGS. 9 and 10. The magnitude of the peak of the strength of vibrations and the frequency at which the peak occurs change according to the state of the levee 20. Specifically, the magnitude of the peak of the strength of vibrations is large when erosion has occurred in the levee 20 (FIG. 10) as compared with when the levee 20 is normal (FIG. 9). Further, when erosion has occurred in the levee 20, the frequency at which the peak occurs has been shifted to the high frequency side from the peak that occurs when the levee 20 is normal.

Therefore, the specifying unit 51 determines whether or not overtopping has occurred based on the magnitude of the peak of the strength of vibrations and the frequency at which the peak occurs. For example, the specifying unit 51 holds (i.e., stores) information about the magnitude of the peak of the strength of vibrations in the state where the levee 20 is normal (FIG. 9) and the frequency at which the peak occurs, and determines whether or not overtopping has occurred by a comparison with the held information.

In the example shown in FIG. 10, the magnitude of the peak of the strength of vibrations is large as compared with the held information (the information shown in FIG. 9), and the frequency at which the peak occurs is shifted to the high frequency side. Therefore, the specifying unit 51 can determine that overtopping of the water W of the river 10 has occurred. Further, the specifying unit 51 can determine that a defect (erosion in this example) has occurred in the levee 20 based on the result of the above-described determination. Further, the specifying unit 51 can specify the position on the levee 20 (i.e., the distance from the sensing apparatus 40) where the defect has occurred.

(3) Third Method

Figure 11:
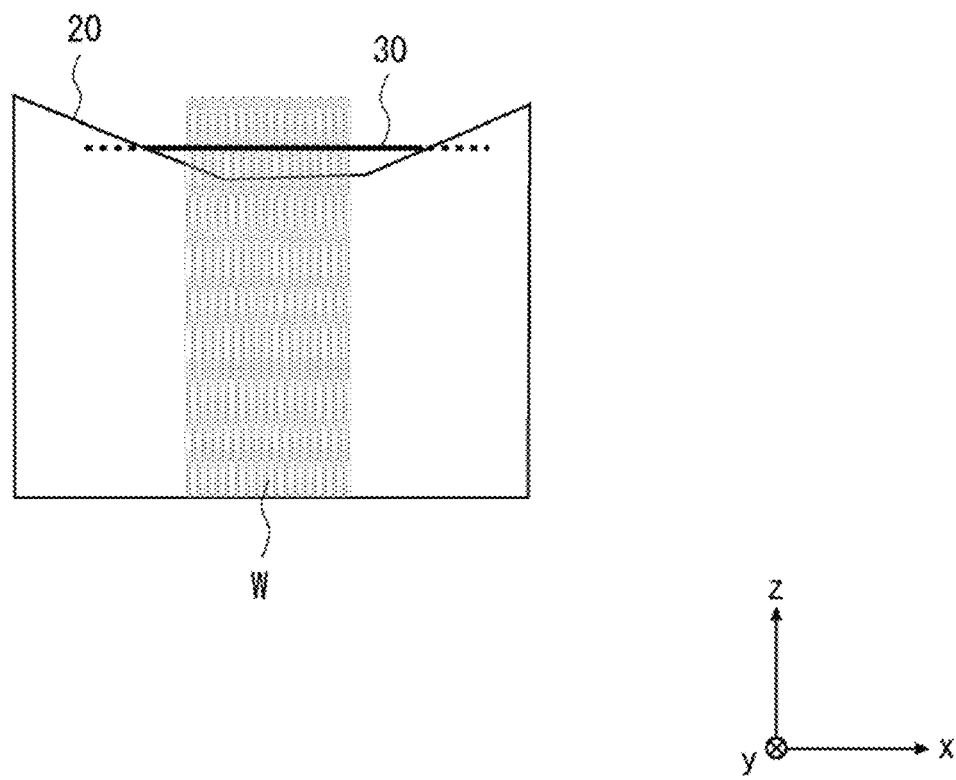
FIG. 11 is a cross-sectional diagram showing an example of a levee when an optical fiber is exposed and inundated with water due to overtopping and erosion of the levee.
Figure 12:
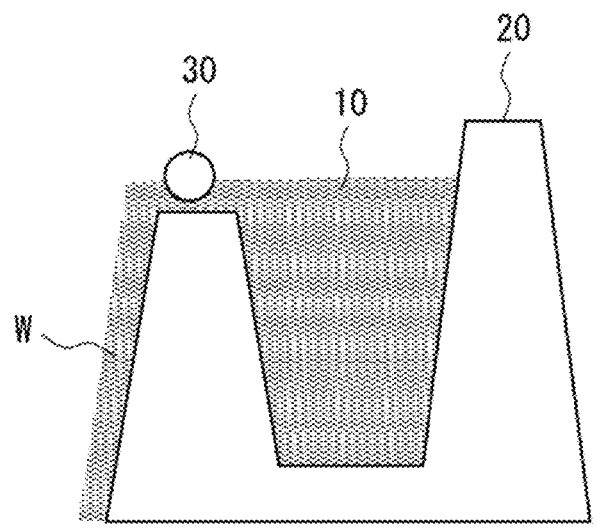
FIG. 12 is a cross-sectional diagram showing an example of a levee when an optical fiber is exposed and inundated with water due to overtopping and erosion of the levee.
Figure 12:
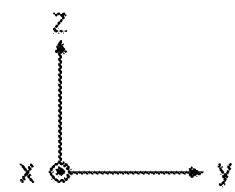
Figure 13:
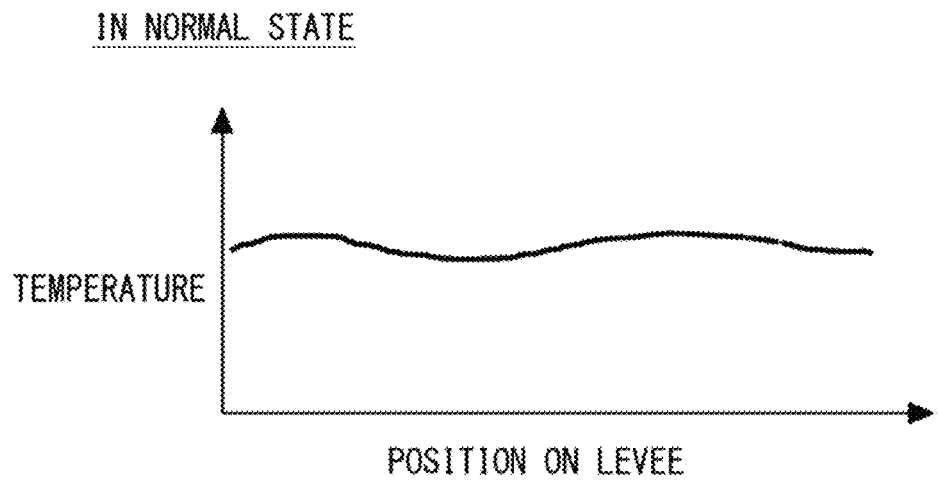
FIG. 13 shows an example of a temperature pattern contained in an optical signal received by the communication unit according to the first example embodiment.
Figure 14:
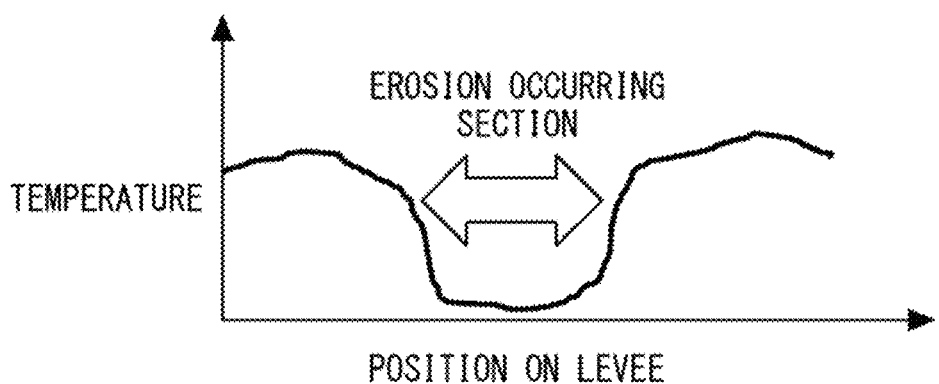
FIG. 14 shows an example of a temperature pattern contained in an optical signal received by the communication unit according to the first example embodiment.

Next, a third method for specifying the water level of the river 10 will be described with reference to FIGS. 11 to 14. As shown in FIGS. 11 and 12, the third method is an example in which when the levee 20 has been eroded due to the overtopping of the water W of the river 10, and the optical fiber 30 has been exposed and inundated with water due to the erosion of the levee 20, the overtopping of the river 10 is specified (i.e., determined). Note that, in each of FIGS. 11 and 12, a cross section of the levee 20 in a state in which the optical fiber 30 has been exposed and inundated with water due to the overtopping and the erosion of the levee 20 is shown. FIG. 11 shows a cross section parallel to the river 10 and FIG. 12 shows a cross section perpendicular to the river 10. Each of FIGS. 13 and 14 shows a temperature pattern contained in the optical signal received by the communication unit 41, in which the horizontal axis indicates the position on the levee 20 (i.e., the distance from the sensing apparatus 40) and the vertical axis indicates the temperature. In particular, FIG. 13 shows an example of a temperature pattern when the levee 20 is normal, and FIG. 14 shows an example of a temperature pattern when the levee 20 is abnormal (an occurrence of erosion in this example).

As shown in FIG. 13, when the levee 20 is normal, changes in the temperature according to the position on the levee 20 (i.e., the distance from the sensing apparatus 40) is gentle.

In contrast to this, as shown in FIG. 14, when erosion has occurred in the levee 20, a sudden change (a sudden drop) in the temperature occurs in the section where the erosion has occurred. It is presumed that this phenomenon has occurred because a part of the optical fiber 30 has been exposed and inundated with water due to the erosion.

Therefore, in the example shown in FIG. 14, the specifying unit 51 can determine that the overtopping of the water W of the river 10 has occurred. Further, the specifying unit 51 can determine that a defect (erosion in this example) has occurred in the levee 20 based on the result of the above-described determination. Further, the specifying unit 51 can specify the position on the levee 20 (i.e., the distance from the sensing apparatus 40) where the defect has occurred.

(4) Fourth Method

Figure 15:
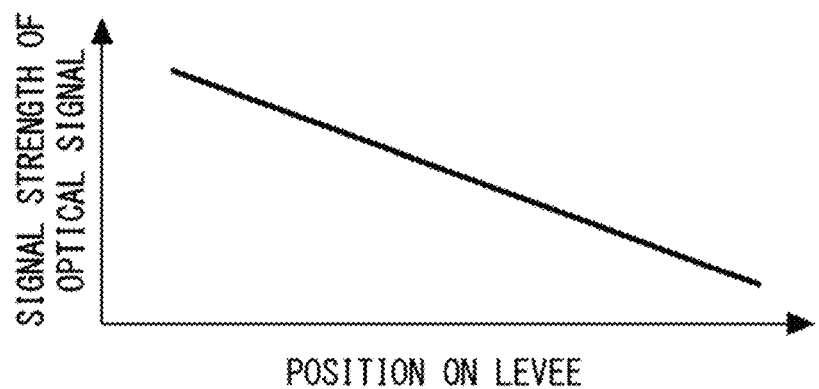
FIG. 15 shows an example of the signal strength of an optical signal received by the communication unit according to the first example embodiment.
Figure 16:
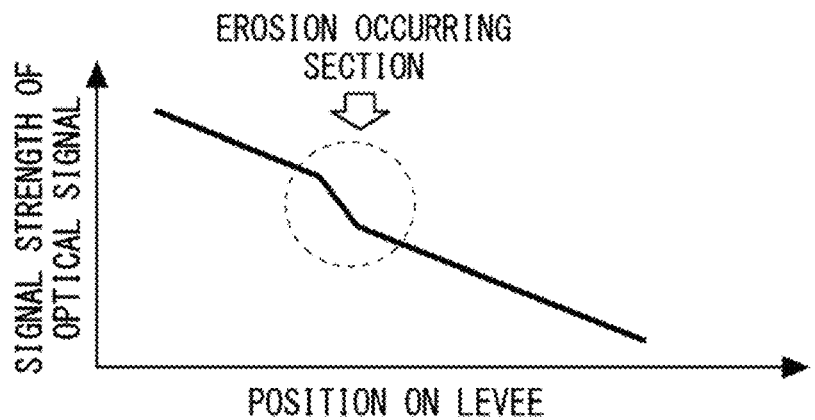
FIG. 16 shows an example of the signal strength of an optical signal received by the communication unit according to the first example embodiment.

Next, a fourth method for specifying the water level of the river 10 will be described referring to FIGS. 15 and 16. Similarly to the third method, the fourth method is an example in which when the levee 20 has been eroded due to the overtopping of the water W of the river 10, and the optical fiber 30 has been exposed and inundated with water due to the erosion of the levee 20 (see, for example, FIGS. 11 and 12), the overtopping of the river 10 is specified (i.e., determined). Each of FIGS. 15 and 16 shows the strength of the optical signal received by the communication unit 41, in which the horizontal axis indicates the position on the levee 20 (i.e., the distance from the sensing apparatus 40) and the vertical axis indicates the strength of the signal. In particular, FIG. 15 shows an example of the strength of the signal when the levee 20 is normal, and FIG. 16 shows an example of the strength of the signal when the levee 20 is abnormal (an occurrence of erosion in this example).

As shown in FIG. 15, when the levee 20 is normal, changes in the strength of the optical signal according to the position on the levee 20 (i.e., the distance from the sensing apparatus 40) is gentle.

In contrast to this, as shown in FIG. 16, when erosion has occurred on the levee 20, the strength of the optical signal has decreased in the section where the erosion has occurred. It is presumed that this phenomenon has occurred because a part of the optical fiber 30 has been exposed and inundated with water due to the erosion, and this part, which has been exposed and inundated with water, has been significantly bent due to the pressure of the water W, so that the loss of the optical signal has increased.

Therefore, in the example shown in FIG. 16, the specifying unit 51 can determine that the overtopping of the water W of the river 10 has occurred. Further, the specifying unit 51 can determine that a defect (erosion in this example) has occurred in the levee 20 based on the result of the above-described determination. Further, the specifying unit 51 can specify the position on the levee 20 (i.e., the distance from the sensing apparatus 40) where the defect has occurred.

Next, an example of an overall flow of operations performed by the specifying system according to the first example embodiment will be described with reference to FIG. 17.

Figure 17:
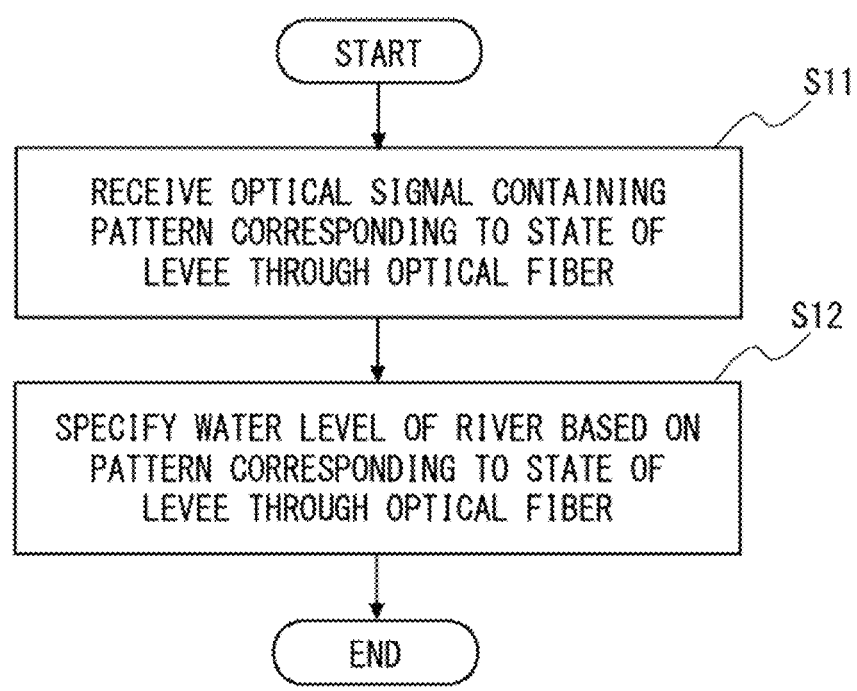
FIG. 17 shows an example of an overall flow of operations performed by a specifying system according to the first example embodiment.

As shown in FIG. 17, the communication unit 41 receives an optical signal containing a pattern that changes according to the state of the levee 20 from the optical fiber 30 that is laid along the levee 20 of the river 10 (Step S11).

Next, the specifying unit 51 specifies the rise of the water level of the river 10 and an occurrence of overtopping, i.e., specifies the water level of the river 10 based on the pattern that changes according to the state of the levee 20, contained in the optical signal received by the communication unit 41 (Step S12). This specifying process may be carried out, for example, by using any of the above-described first to fourth methods.

As described above, according to the first example embodiment, the communication unit 41 receives an optical signal containing a pattern that changes according to the state of the levee 20 from the optical fiber 30 that is laid along the levee 20 of the river 10. The specifying unit 51 specifies the water level of the river 10 based on the pattern that changes according to the state of the levee 20, contained in the optical signal received by the communication unit 41. In this way, it is possible to specify the water level of the river 10.

Further, the specifying unit 51 may specify a defect such as erosion of the levee 20 based on the water level of the river 10, and a place where the defect of the levee 20 has occurred based on the optical signal received by the communication unit 41. In this way, it is possible to specify a defect of the levee 20 caused by the water level of the river 10 as well as the water level of the river 10 itself, and also to specify the place where the defect of the levee 20 has occurred.

Second Example Embodiment

Next, an example of a configuration of a specifying system according to a second example embodiment will be described with reference to FIG. 18.

Figure 18:
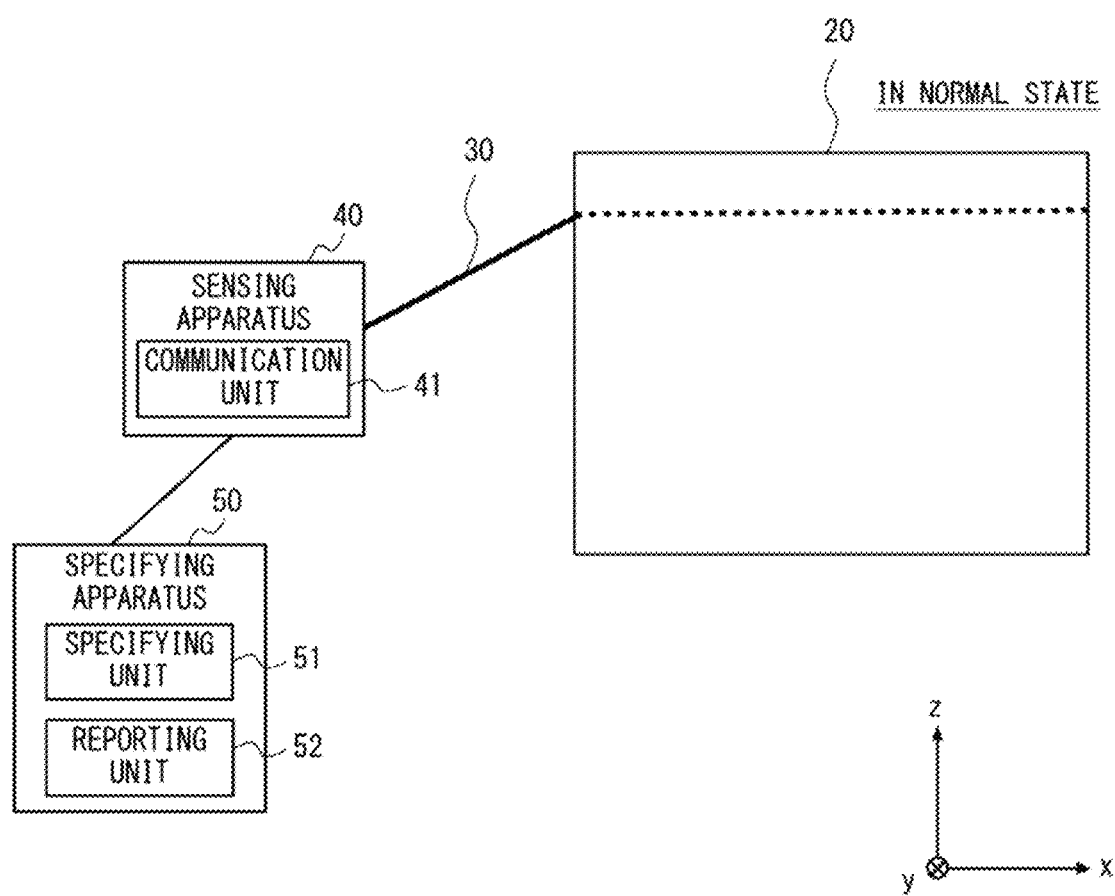
FIG. 18 shows an example of a configuration of a specifying system according to a second example embodiment.

As shown in FIG. 18, the configuration of the specifying system according to the second example embodiment differs from that of the above-described first example embodiment in that the specifying apparatus 50 includes a reporting unit 52.

When the specifying unit 51 specifies a defect of the levee 20 and specifies the place where the defect of the levee 20 has occurred, the reporting unit 52 reports the occurrence of the defect of the levee 20 and the place where the defect has occurred to a predetermined terminal (not shown). The predetermined terminal is, for example, a terminal possessed by a monitoring staff present at the site or a terminal installed in a monitoring center. The reporting method may be, for example, a method in which a GUI (Graphical User Interface) screen (e.g., a GUI window) is displayed on a display, a monitor, or the like of the predetermined terminal, or may be a method in which a voice (or sound) message is output from a speaker of the predetermined terminal.

Figure 19:
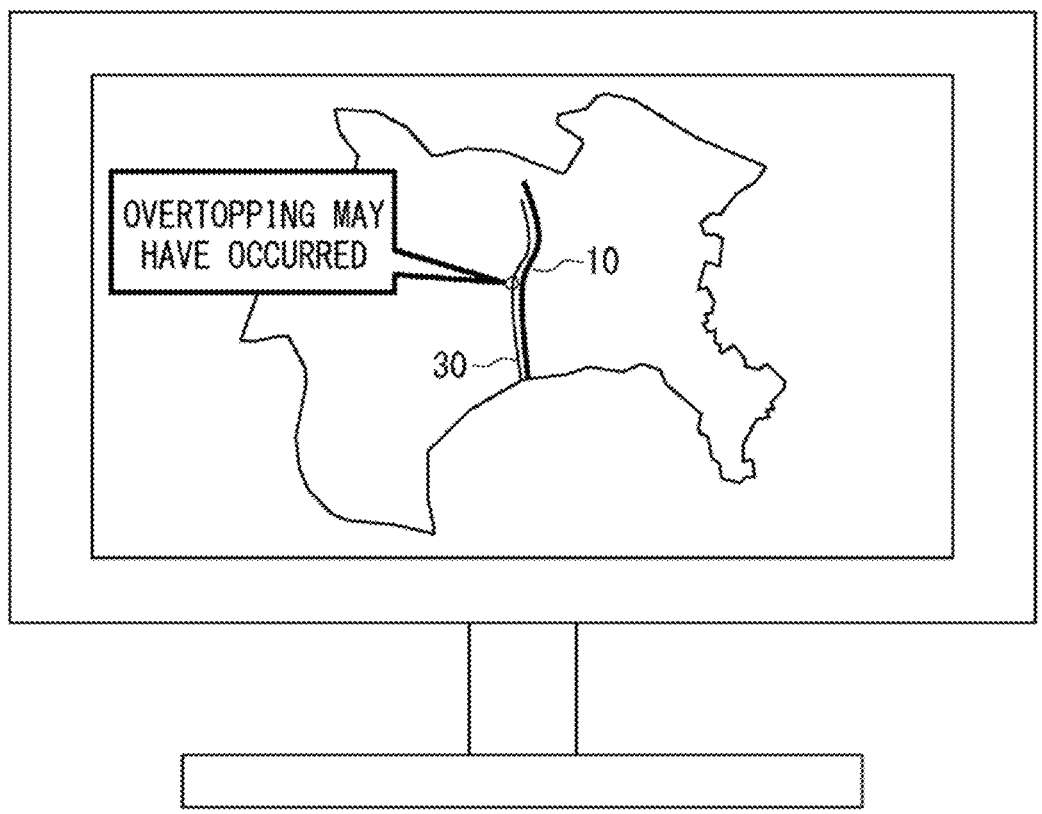
FIG. 19 shows an example of a GUI screen that a reporting unit according to the second example embodiment displays in a specified terminal.

For example, when the above-described reporting is performed by displaying a GUI screen, the reporting unit 52 operates as follows. The reporting unit 52 holds (i.e., stores) information indicating the place where the optical fiber 30 is laid and map information in association with each other in advance. When the specifying unit 51 specifies a defect of the levee 20 and the place where the defect has occurred, the reporting unit 52 displays, on a predetermined terminal, a GUI screen on which the defect occurrence place specified by the specifying unit 51 is superimposed on the map. FIG. 19 shows an example of the above-described GUI screen. On the GUI screen shown in FIG. 19, the place where the optical fiber 30 is laid, a message indicating that overtopping may have occurred, and the place where the overtopping may have occurred are superimposed on the map.

Next, an example of an overall flow of operations performed by the specifying system according to the second example embodiment will be described with reference to FIG. 20.

Figure 20:
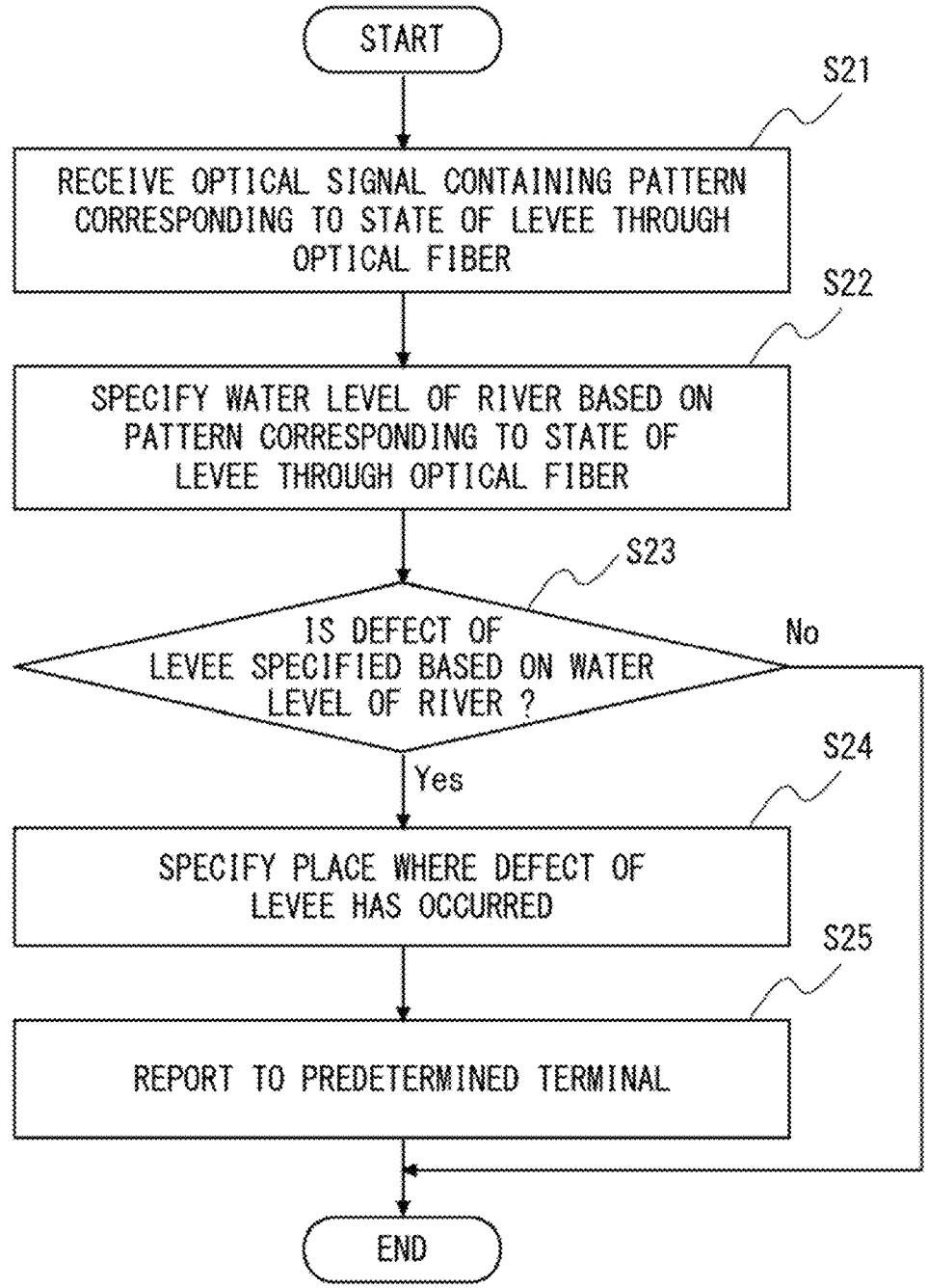
FIG. 20 shows an example of an overall flow of operations performed by a specifying system according to the second example embodiment.

As shown in FIG. 20, firstly, steps S21 and S22, which are similar to the steps S11 and S12 shown in FIG. 17, are performed.

Next, the specifying unit 51 attempts to specify a defect such as erosion of the levee 20 based on the water level of the river 10 (Step S23).

When the specifying unit 51 specifies a defect of the levee 20 in the step S23 (Yes in Step S23), then, it specifies the place where the defect of the levee 20 has occurred based on the optical signal received by the communication unit 41 (Step S24).

After that, the reporting unit 52 reports, to the predetermined terminal, the fact that the defect of the levee 20 has occurred and the place where the defect has occurred (Step S25). This reporting may be carried out, for example, by using a GUI screen like the one shown in FIG. 19.

As described above, according to the second example embodiment, when the specifying unit 51 specifies a defect of the levee 20 and the place where the defect has occurred, the reporting unit 52 reports, to the predetermined terminal, the fact that the defect of the levee 20 has occurred and the place where the defect has occurred. In this way, for example, it is possible to notify a monitoring staff or the like that the defect of the levee 20 has occurred and the place where the defect has occurred.

Other effects are similar to those in the above-described first example embodiment.

Third Example Embodiment

Next, an example of a configuration of a specifying system according to a third example embodiment will be described with reference to FIG. 21. Note that FIG. 21 shows a cross section of the levee 20 in a normal state, parallel to the river 10.

Figures 21, 22:
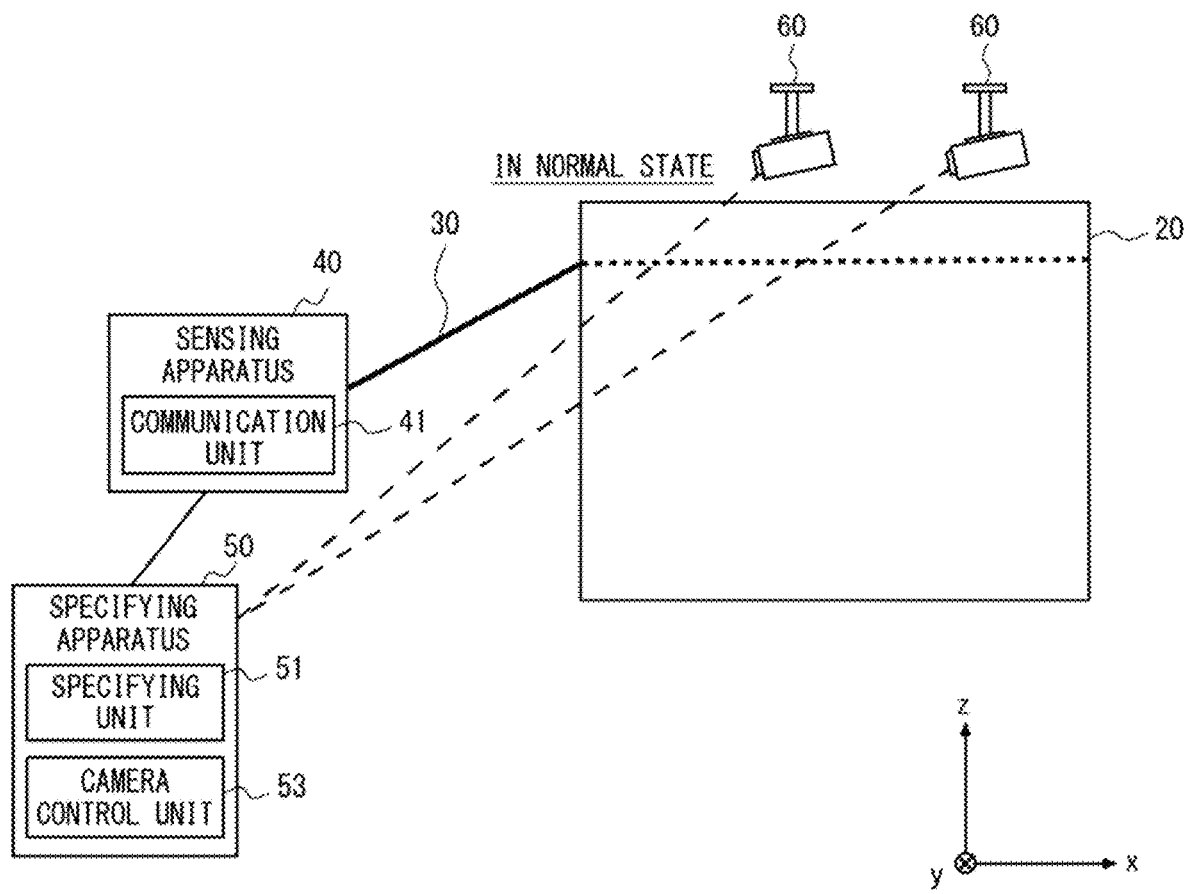
FIG. 21 shows an example of a configuration of a specifying system according to a third example embodiment.
FIG. 22 shows an example of camera information held by a camera control unit according to the third example embodiment.

As shown in FIG. 21, the configuration of the specifying system according to the third example embodiment differs from that of the above-described first example embodiment in that it includes a camera 60 and its specifying apparatus includes a camera control unit 53.

The camera 60 is a camera for monitoring the river 10, and is implemented by, for example, a fixed camera, a PTZ (Pan Tilt Zoom) camera, or the like. The camera 60 has a function of wirelessly receiving a shooting instruction from the camera control unit 53, a function of taking a video image according to the shooting instruction, and a function of wirelessly transmitting the taken camera video image to the camera control unit 53. Note that the specifying system may include at least one camera 60, and the number of cameras 60 is not limited to any particular number.

As shown in FIG. 22, the camera control unit 53 holds camera information indicating an identifier of the camera 60 and an area or the like where the camera can take an image. FIG. 22 is an example of the camera information when three cameras 60 are installed, and areas where the cameras can take an image is indicated by distances from the sensing apparatus 40.

When the specifying unit 51 specifies a defect of the levee 20 and specifies the place where the defect of the levee 20 has occurred, the camera control unit 53 selects a camera 60 that will photograph (or film) an area including the place where the defect has occurred based on the camera information like the one shown in FIG. 22, and controls the selected camera 60 so as to photograph (or film) the place where the defect has occurred. For example, the camera control unit 53 wirelessly transmits, to the selected camera 60, a shooting instruction specifying the angles (the azimuth and the elevation) of the camera 60 for photographing the place where the defect has occurred, the zoom magnification, and the like.

Therefore, when the specifying unit 51 specifies a defect of the levee 20, it can acquire a camera video image of the place where the defect of the levee 20 has occurred, so that it can specify details of the defect of the levee 20 (e.g., details, the extent, and the like of the defect) based on the camera video image.

Next, an example of an overall flow of operations performed by the specifying system according to the third example embodiment will be described with reference to FIG. 23.

Figure 23:
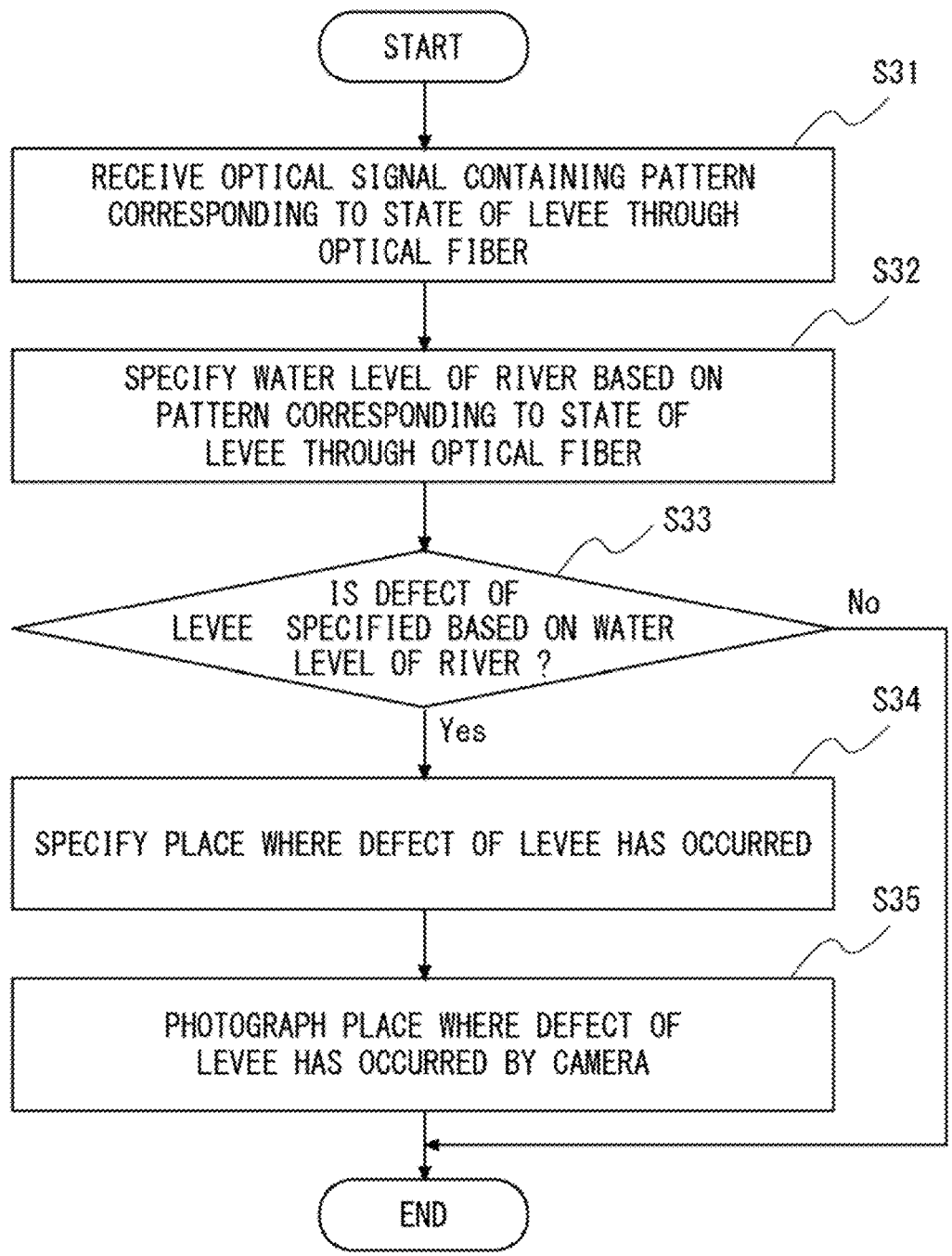
FIG. 23 shows an example of an overall flow of operations performed by a specifying system according to the third example embodiment.

As shown in FIG. 23, firstly, steps S31 to S34, which are similar to the steps S21 to S24 shown in FIG. 21, are performed.

After that, the camera control unit 53 selects a camera 60 that will photograph an area including the place where the defect of the levee 20 has occurred and controls the selected camera 60 so as to photograph (or film) the place where the defect has occurred (Step S35).

As described above, according to the third example embodiment, when the specifying unit 51 specifies a defect of the levee 20 and the place where the defect has occurred, the camera control unit 53 controls the camera 60 so as to photograph (or film) the place where the defect has occurred. In this way, the specifying unit 51 can specify details of the defect of the levee 20 (e.g., details, the extent, and the like of the defect) based on the camera video image.

Note that although the third example embodiment has been described as a modified example of the above-described first example embodiment, it is not limited to such an example. The third example embodiment can also be a modified example of the above-described second example embodiment.

Fourth Example Embodiment

In the above-described third example embodiment, it has been assumed that the optical fiber 30 is an optical fiber 30 that is exclusively used for the sensing and the camera 60 wirelessly transmits/receives a camera video image, a shooting instruction, and the like to/from the specifying apparatus 50.

In contrast, in a fourth example embodiment, the optical fiber 30 is an optical fiber that is used for both the communication and the sensing, and is connected to the camera 60. Further, the camera 60 transmits/receives a camera video image, a shooting instruction, and the like to/from the specifying apparatus through the optical fiber 30 and the sensing apparatus 40.

Figure 24:
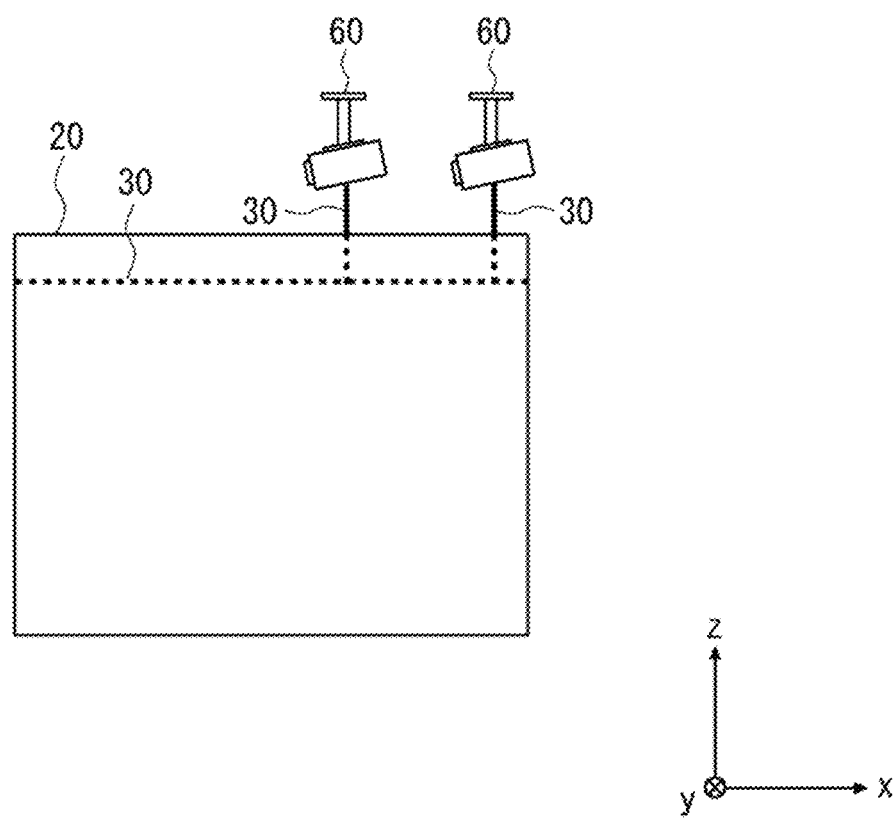
FIG. 24 shows an example of an aspect in which an optical fiber and a camera are installed in a specifying system according to a fourth example embodiment.
Figure 25:
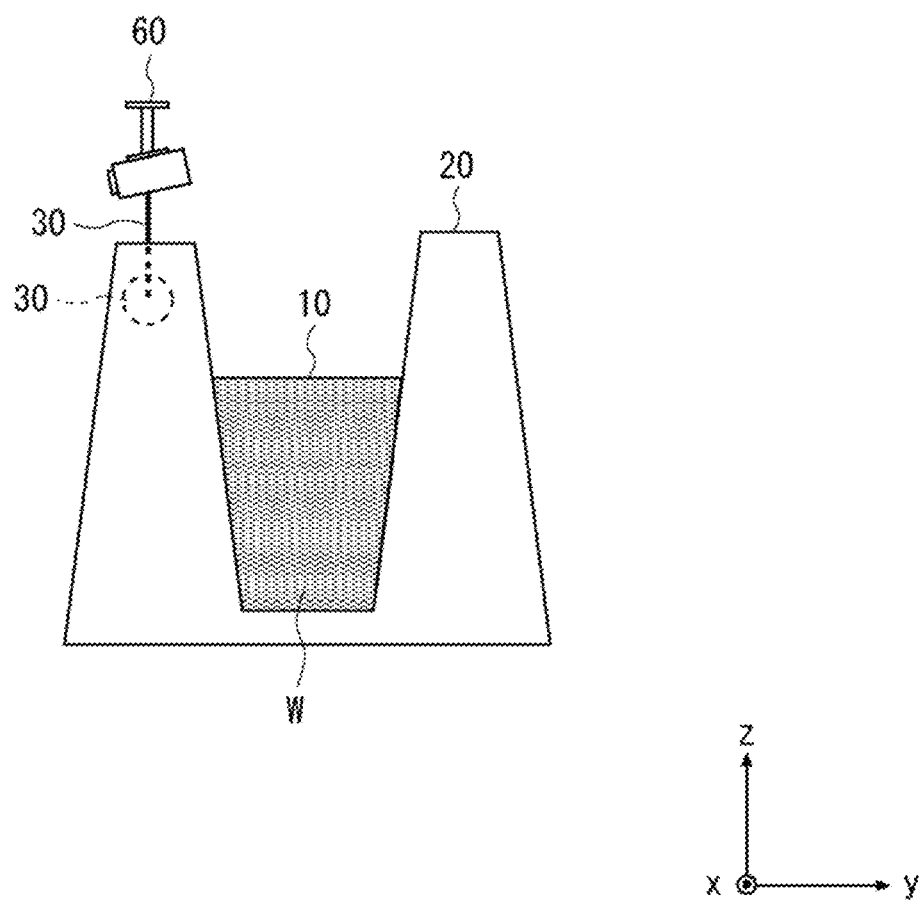
FIG. 25 shows an example of an aspect in which an optical fiber and a camera are installed in the specifying system according to the fourth example embodiment.

Next, an example as to how the optical fiber 30 and the camera 60 in the specifying system according to the fourth example embodiment are arranged will be described with reference to FIGS. 24 and 25. Note that FIGS. 24 and 25 show cross sections of the levee 20 in a normal state. In particular, FIG. 24 shows a cross section parallel to the river 10 and FIG. 25 shows a cross section perpendicular to the river 10.

As shown in FIGS. 24 and 25, in the specifying system according to the fourth example embodiment, the camera(s) 60 is fixed to a pole(s), such as a telephone pole(s), present on the levee 20. Further, the optical fiber 30 is buried inside the levee 20. However, a part of the optical fiber 30 is branched off, and the branched part of the optical fiber 30 is connected to the camera 60.

Note that the rest of the configuration of the specifying system according to the fourth example embodiment is similar to that of the above-described specifying system according to the third example embodiment, and therefore the description thereof is omitted.

As described above, in the specifying system according to the fourth example embodiment, since a part of the optical fiber 30 is connected to the camera 60 fixed to the pole, the part of the optical fiber 30 is exposed at all times.

Figure 26:
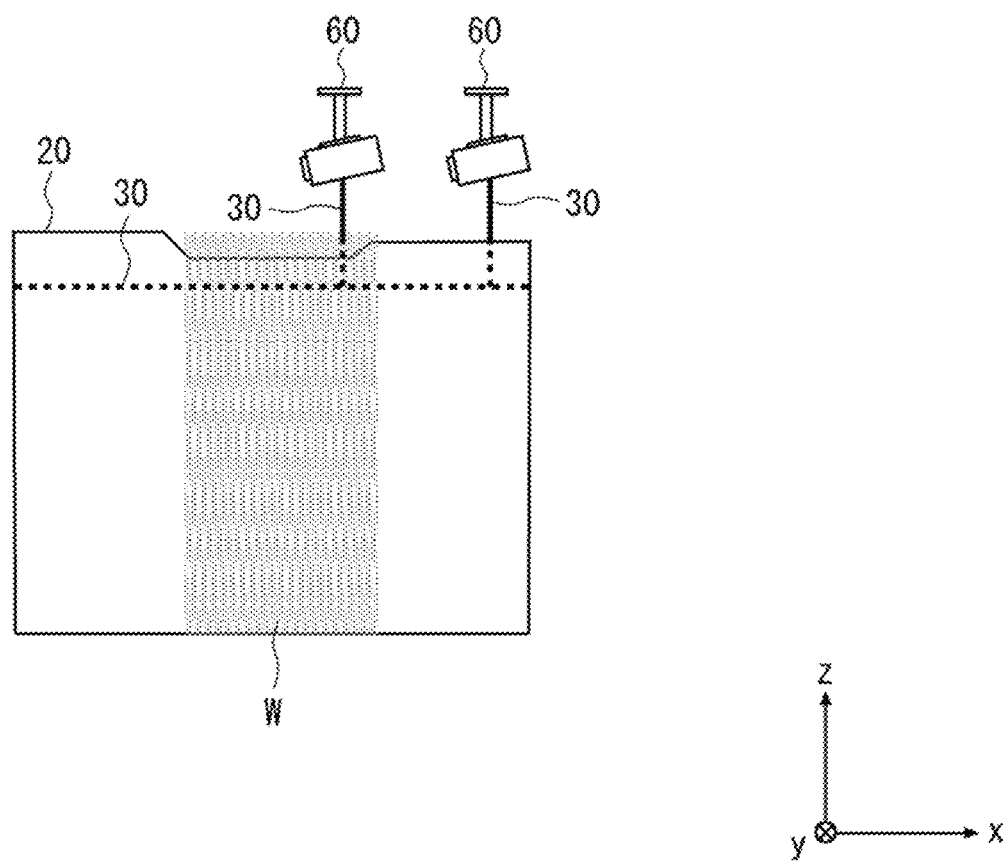
FIG. 26 is a cross-sectional diagram showing an example of a levee in which a camera is installed when an optical fiber is exposed and inundated with water due to overtopping and erosion of the levee.
Figure 27:
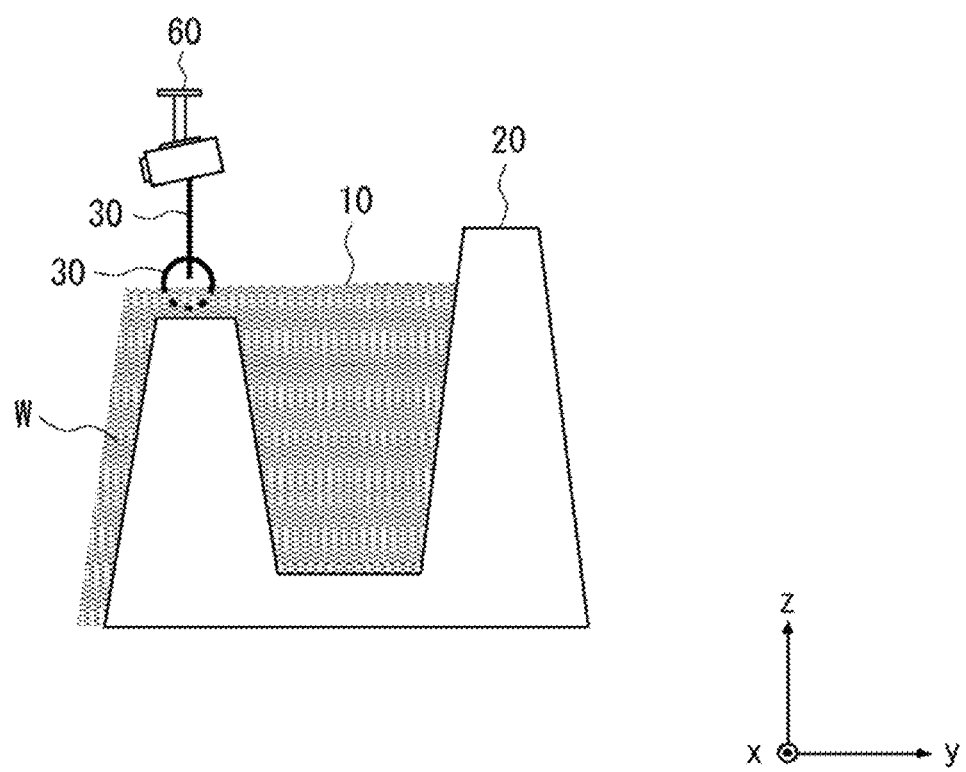
FIG. 27 is a cross-sectional diagram showing an example of a levee in which a camera is installed when an optical fiber is exposed and inundated with water due to overtopping and erosion of the levee.

Therefore, as shown in FIGS. 26 and 27, even when overtopping has occurred to such a degree that the levee 20 is slightly eroded, the optical fiber 30 is partially inundated with water and hence vibrations and/or changes in temperature occur in the water-inundated part. Note that FIGS. 26 and 27 show cross sections of the levee 20 when the optical fiber 30 has been inundated with water due to overtopping of the water W of the river 10 and slight erosion of the levee 20. FIG. 26 shows a cross section parallel to the river 10 and FIG. 27 shows a cross section perpendicular to the river 10.

Further, even when overtopping has occurred to such a degree that the levee 20 is not eroded, the optical fiber 30 is partially inundated with water and hence vibrations and/or changes in temperature occur in the water-inundated part.

Therefore, in the specifying system according to the fourth example embodiment, even when slight overtopping has occurred, the specifying unit 51 can specify the water level of the river 10 by using any of the above-described first to third methods.

Note that the overall operation and other effects of the specifying system according to the fourth example embodiment are similar to those of the above-described specifying system according to the third example embodiment, and therefore the descriptions thereof are omitted.

Other Example Embodiment

Figure 28:
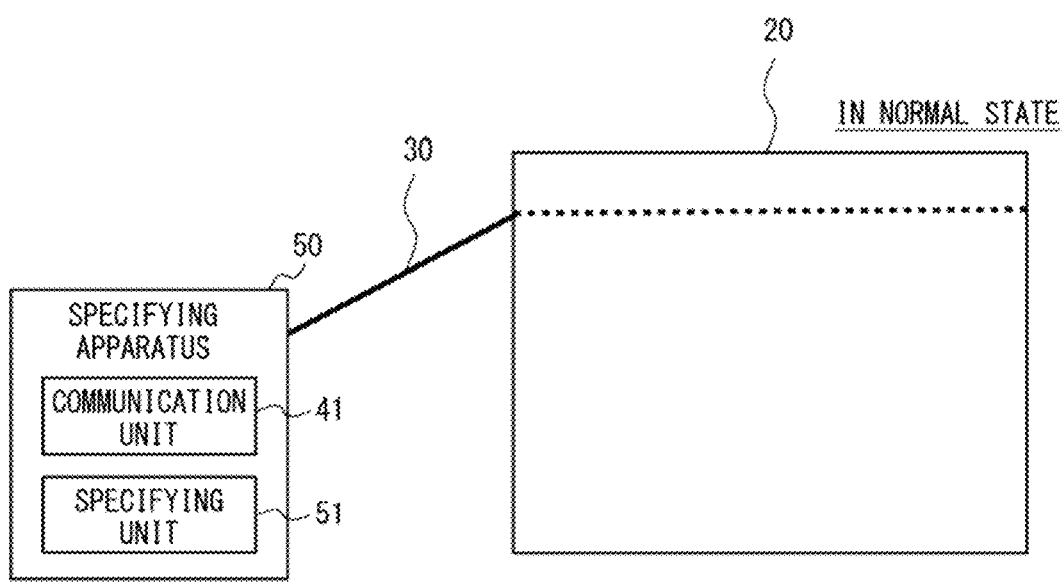
FIG. 28 shows an example of a configuration of a specifying system according to another example embodiment.

The communication unit 41 is separated from the specifying apparatus 50 in the above-described example embodiments, it is not limited to such an example. The communication unit 41 may be provided inside the specifying apparatus 50. FIG. 28 shows an example of a configuration of a specifying system in which the communication unit 41 is provided inside the specifying apparatus 50. Note that the specifying system shown in FIG. 28 may include a reporting unit 52 inside the specifying apparatus 50 as in the above-described second example embodiment, or may include a camera 60 and include a camera control unit 53 inside the specifying apparatus 50 as in the above-described third example embodiment. Alternatively or additionally, the optical fiber 30 may be connected to the camera 60 as in the above-described fourth example embodiment.

<Hardware Configuration of Specifying Apparatus>

Next, a hardware configuration of a computer 70 by which the specifying apparatus 50 is implemented will be described with reference to FIG. 29.

Figure 29:
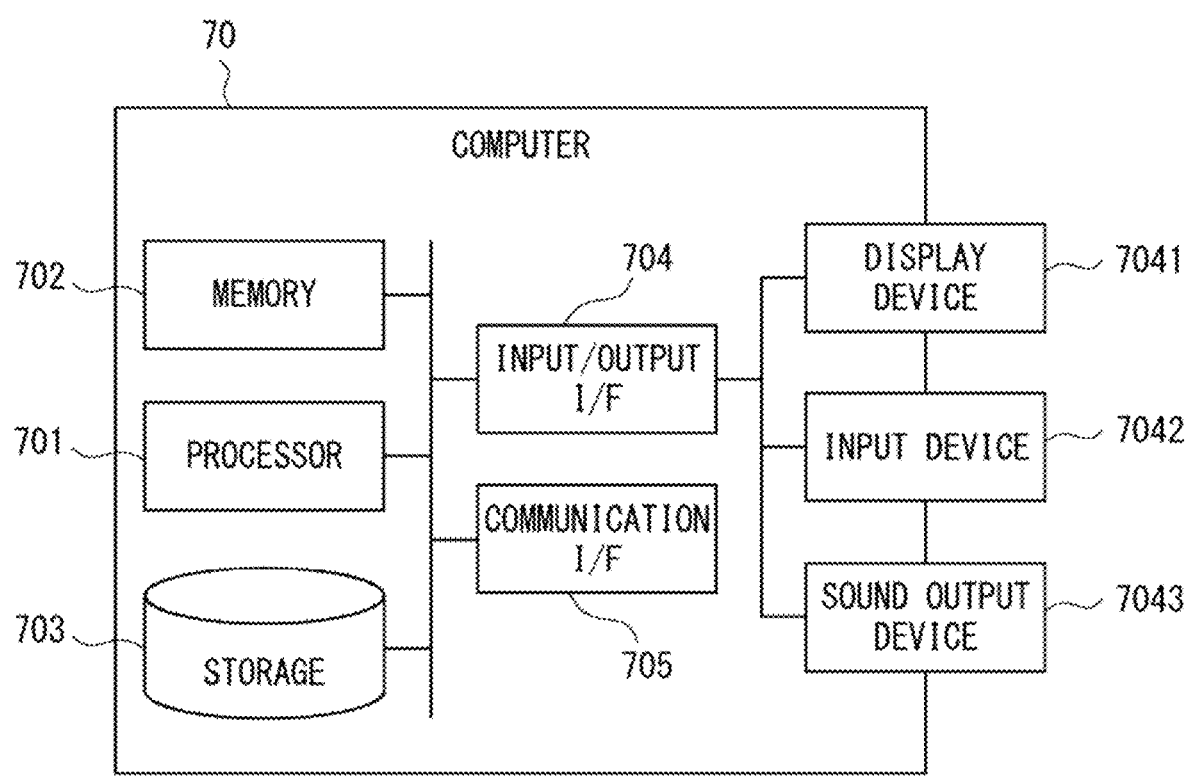
FIG. 29 is a block diagram showing an example of a hardware configuration of a computer that implements a specifying apparatus according to an example embodiment.

As shown in FIG. 29, the computer 70 includes a processor 701, a memory 702, a storage 703, an input/output interface (input/output I/F) 704, a communication interface (communication I/F) 705, and the like. The processor 701, the memory 702, the storage 703, the input/output interface 704, and the communication interface 705 are connected to each other through data transmission paths for transmitting/receiving data to/from each other.

The processor 701 is, for example, an arithmetic processing unit such as a CPU (Central Processing Unit) or a GPU (Graphics Processing Unit). The memory 702 is, for example, a memory such as a RAM (Random Access Memory) or a ROM (Read Only Memory). The storage 703 is, for example, a storage device such as an HDD (Hard Disk Drive), an SSD (Solid State Drive), a memory card, or the like. Further, the storage 703 may be a memory such as a RAM or a ROM.

The storage 703 stores programs for implementing the functions of the components included in the specifying apparatus 50. The processor 701 implements each of the functions of the components included in the specifying apparatus 50 by executing a respective one of the programs. Note that when the processor 701 executes each of the above-described programs, it may execute the program after loading it into the memory 702 or may execute it without loading it into the memory 702. Further, the memory 702 and the storage 703 also serve to store information and data held by the components included in the specifying apparatus 50.

Further, the above-described program may be stored in various types of non-transitory computer readable media and thereby supplied to computers (including the computer 70). The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Compact Disc-ROM), a CD-R (CD-Recordable), a CD-R/W (CD-ReWritable), and a semiconductor memory (such as a mask ROM, a PROM (Programmable ROM), an EPROM (Erasable PROM), a flash ROM, and a RAM). Further, the programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line such as an electric wire and an optical fiber or a wireless communication line.

The input/output interface 704 is connected to a display device 7041, an input device 7042, a sound (or voice) output device 7043, and the like. The display device 7041 is a device, such as an LCD (Liquid Crystal Display), a CRT (Cathode Ray Tube) display, or a monitor, that displays a screen corresponding to drawing data processed by the processor 701. The input device 7042 is a device that receives an operation input by an operator, such as a keyboard, a mouse, and a touch sensor, or the like. The display device 7041 and the input device 7042 may be integrated with each other and hence implemented as a touch panel. The sound output device 7043 is a device, such as a speaker, that outputs a sound (or a voice) corresponding to acoustic data processed by the processor 701.

The communication interface 705 transmits/receives data to/from an external apparatus. For example, the communication interface 705 communicates with an external apparatus through a wired or wireless communication path.

Although the present disclosure is described above with reference to example embodiments, the present disclosure is not limited to the above-described example embodiments. Various modifications that can be understood by those skilled in the art can be made to the configuration and details of the present disclosure within the scope of the disclosure.

For example, the above-described example embodiments may be used while combining the whole or parts of two or more example embodiments with each other.

Further, the whole or part of the embodiments disclosed above can be described as, but not limited to, the following supplementary notes.

(Supplementary Note 1)
A specifying system comprising:
an optical fiber laid along a levee of a river;
a communication unit configured to receive, from the optical fiber, an optical signal containing a pattern that changes according to a state of the levee; and
a specifying unit configured to specify a water level of the river based on the pattern.

(Supplementary Note 2)
The specifying system described in Supplementary note 1, wherein the specifying unit specifies the water level of the river based on a pattern that changes according to a vibration state or a temperature state of the levee, contained in the optical signal.

(Supplementary Note 3)
The specifying system described in Supplementary note 1 or 2, wherein the specifying unit specifies a defect of the levee based on a strength of the optical signal and specifies a place where the defect of the levee has occurred based on the optical signal.

(Supplementary Note 4)
The specifying system described in Supplementary note 1 or 2, wherein the specifying unit specifies a defect of the levee based on the water level of the river and specifies a place where the defect of the levee has occurred based on the optical signal.

(Supplementary Note 5)
The specifying system described in Supplementary note 3 or 4, further comprising:
a camera configured to monitor the river; and
a camera control unit configured to control the camera so as to photograph the place where the defect of the levee has occurred.

(Supplementary Note 6)
A specifying apparatus comprising:
a communication unit configured to receive, from an optical fiber laid along a levee of a river, an optical signal containing a pattern that changes according to a state of the levee; and
a specifying unit configured to specify a water level of the river based on the pattern.

(Supplementary Note 7)
The specifying apparatus described in Supplementary note 6, wherein the specifying unit specifies the water level of the river based on a pattern that changes according to a vibration state or a temperature state of the levee, contained in the optical signal.

(Supplementary Note 8)
The specifying apparatus described in Supplementary note 6 or 7, wherein the specifying unit specifies a defect of the levee based on a strength of the optical signal, and specifies a place where the defect of the levee has occurred based on the optical signal.

(Supplementary Note 9)
The specifying apparatus described in Supplementary note 6 or 7, wherein the specifying unit specifies a defect of the levee based on the water level of the river, and specifies a place where the defect of the levee has occurred based on the optical signal.

(Supplementary Note 10)
The specifying apparatus described in Supplementary note 8 or 9, further comprising a camera control unit configured to control a camera configured to monitor the river so that the camera photographs the place where the defect of the levee has occurred.

(Supplementary Note 11)
A specifying method performed by a specifying apparatus, comprising:
a receiving step of receiving, from an optical fiber laid along a levee of a river, an optical signal containing a pattern that changes according to a state of the levee; and
a specifying step of specifying a water level of the river based on the pattern.

(Supplementary Note 12)
The specifying method described in Supplementary note 11, wherein in the specifying step, the water level of the river is specified based on a pattern that changes according to a vibration state or a temperature state of the levee, contained in the optical signal.

(Supplementary Note 13)
The specifying method described in Supplementary note 11 or 12, wherein in the specifying step, a defect of the levee is specified based on a strength of the optical signal, and a place where the defect of the levee has occurred is specified based on the optical signal.

(Supplementary Note 14)
The specifying method described in Supplementary note 11 or 12, wherein in the specifying step, a defect of the levee is specified based on the water level of the river, and a place where the defect of the levee has occurred is specified based on the optical signal.

(Supplementary Note 15)
The specifying method described in Supplementary note 13 or 14, further comprising a step of controlling a camera configured to monitor the river so that the camera photographs the place where the defect of the levee has occurred.

REFERENCE SIGNS LIST

10 RIVER
20 LEVEE
30 OPTICAL FIBER
40 SENSING APPARATUS
41 COMMUNICATION UNIT
50 SPECIFYING APPARATUS
51 SPECIFYING UNIT
52 REPORTING UNIT
53 CAMERA CONTROL UNIT
60 CAMERA
70 COMPUTER

701 PROCESSOR
702 MEMORY
703 STORAGE
704 INPUT/OUTPUT INTERFACE
7041 DISPLAY DEVICE
7042 INPUT DEVICE
7043 SOUND OUTPUT DEVICE
705 COMMUNICATION INTERFACE
W WATER

The invention claimed is:

1. A specifying system comprising:
an optical fiber laid along a levee of a river;
at least one memory storing instructions; and
at least one processor configured to execute the instructions to:
receive, from the optical fiber, an optical signal containing a pattern that changes according to a state of the levee;
specify a water level of the river based on the pattern; and
specify the water level of the river based on a pattern that changes according to a vibration state or a temperature state of the levee, contained in the optical signal.

2. The specifying system according to claim 1, wherein the at least one processor is further configured to execute the instructions to specify a defect of the levee based on a strength of the optical signal and specify a place where the defect of the levee has occurred based on the optical signal.

3. The specifying system according to claim 1, wherein the at least one processor is further configured to execute the instructions to specify a defect of the levee based on the water level of the river and specify a place where the defect of the levee has occurred based on the optical signal.

4. The specifying system according to claim 2, further comprising:
a camera configured to monitor the river,
wherein the at least one processor is further configured to execute the instructions to control the camera to photograph the place where the defect of the levee has occurred.

5. A specifying apparatus comprising:
at least one memory storing instructions, and
at least one processor configured to execute the instructions to:
receive, from an optical fiber laid along a levee of a river, an optical signal containing a pattern that changes according to a state of the levee;
specify a water level of the river based on the pattern; and
specify the water level of the river based on a pattern that changes according to a vibration state or a temperature state of the levee, contained in the optical signal.

6. The specifying apparatus according to claim 5, wherein the at least one processor is further configured to execute the instructions to specify a defect of the levee based on a strength of the optical signal, and specify a place where the defect of the levee has occurred based on the optical signal.

7. The specifying apparatus according to claim 5, wherein the at least one processor is further configured to execute the instructions to specify a defect of the levee based on the water level of the river, and specify a place where the defect of the levee has occurred based on the optical signal.

8. The specifying apparatus according to claim 6, wherein the at least one processor is further configured to execute the instructions to control a camera, configured to monitor the river, to photograph the place where the defect of the levee has occurred.

9. A specifying method performed by a specifying apparatus, comprising:
receiving, from an optical fiber laid along a levee of a river, an optical signal containing a pattern that changes according to a state of the levee; and
specifying a water level of the river based on the pattern,
wherein the water level of the river is specified based on a pattern that changes according to a vibration state or a temperature state of the levee, contained in the optical signal.

10. The specifying method according to claim 9, wherein a defect of the levee is specified based on a strength of the optical signal, and a place where the defect of the levee has occurred is specified based on the optical signal.

11. The specifying method according to claim 9, wherein a defect of the levee is specified based on the water level of the river, and a place where the defect of the levee has occurred is specified based on the optical signal.

12. The specifying method according to claim 10, further comprising controlling a camera, configured to monitor the river, to photograph the place where the defect of the levee has occurred.

* * * * *